June 26, 1956 G. T. DAIN 2,752,425
REGENERATIVE REPEATER
Filed April 20, 1949
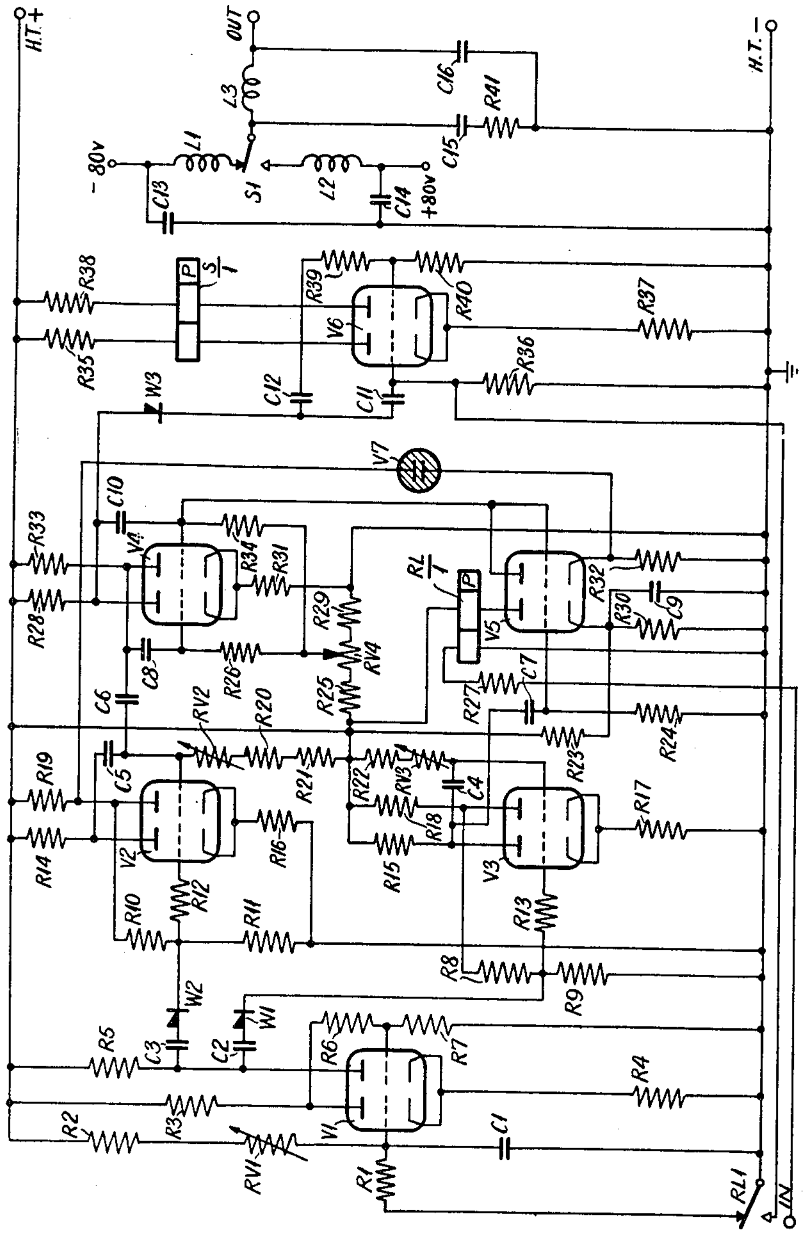
Gordon Taylor Dain, inventor
by Dezsoe Steinherz
attorney United States Patent Office 2,752,425

Patented June 26, 1956

2,752,425

REGENERATIVE REPEATER

Gordon Taylor Dain, Taplow, Buckinghamshire, England, assignor to British Telecommunications Research Limited, Taplow, Buckinghamshire, England, a British company Application April 20, 1949, Serial No. 88,571

Claims priority, application Great Britain June 14, 1948

8 Claims. (Cl. 178—70)

The present invention relates to regenerative repeaters for use in telegraph systems of the start-stop type and is more particularly concerned with repeaters making use of electronic devices for effecting regeneration as opposed to mechanical arrangements which have been used in the past.

It has already been suggested that in a start-stop telegraph system correction of very seriously distorted signals can be satisfactorily effected if the control of the outgoing transmitting relay is effected from the incoming signals for a very short interval in substantially the middle of each of a set of perfectly timed signal elements. With this arrangement the duration of the outgoing signals is determined by the repetition frequency of pulses generated by equipment associated with the repeater and the actual nature of the outgoing signals is determined by the polarity of the incoming signals at the time when they are allowed to become effective for control purposes. The chief object of the present invention is to produce an improved thermionic regenerative repeater operating on these lines and arranged so that adjustment is simple but rarely necessary after the initial lining up, that the repeater requires a negligible amount of maintenance and that its operation is not prejudiced by wide variation in the supply voltage.

According to one feature of the invention in a regenerative repeater for use in a telegraph system of the start-stop type outgoing signals of standard length are produced under the control of an electronic device of the multivibrator type the polarity of the signals being determined in accordance with samples taken during short periods of time corresponding substantially to the middle of the different elements of the character represented by an incoming signal.

It is also a feature of the invention that the stop pulse is not dependent on the incoming signals but is automatically inserted at the right time by the action of the repeater itself. Thus in a distorted signal the time displacement of the incoming stop pulse, which is likely to be greater than that of any of the other signal elements if the speed is incorrect, imposes no limitation on the capacity of the repeater to deal satisfactorily with the incoming signals.

A further advantageous feature of the invention is that spurious signals of short duration are suppressed and do not give rise to false outgoing signals provided such spurious signals have a duration appreciably less than 50% of the signal element, that is to say they terminate before the portion of the signal element is reached during which sampling or scrutinising takes place. This feature is of particular importance for transmission by radio, where spurious signals are more likely to be encountered than in transmission over land lines.

Another important advantage of the arrangements according to the present invention is that they permit the use throughout the repeater of thermionic valves of the same type so that only one type of valve needs to be carried for replacement purposes and the valves can in fact be interchanged without appreciably affecting the operation. This is partly due to the fact that the circuits employed are such that the characteristics of the valve are not critical as most of the valves involved are arranged to have only two states, conducting and non-conducting and for this purpose are preferably of the double-triode type connected in a form of Eccles-Jordan circuit.

The invention will be better understood from the following description of one method of carrying it into effect which should be taken in conjunction with the accompanying drawing. This shows in the usual diagrammatic manner the circuits of a thermionic regenerative repeater incorporating the present invention.

The general method of operation is that when a start signal is received, a timing operation is initiated and after a predetermined delay period representing approximately half a signal element, a multi-vibrator is set in operation to generate short sampling or scrutinising pulses at a predetermined frequency. At the same time two timing circuits are set in operation one effective after six unit elements and the other effective after seven unit elements. In accordance with the result of the successive sampling operations corresponding pulses of standard length are transmitted over the outgoing circuit with the qualification that the final pulse corresponding to the stop element is provided regardless of the incoming signal. It is arranged that the initial pulse representing a start signal must persist for the predetermined delay period if the cycle set out above is to be carried through. Hence spurious signals of shorter duration produce no effect on the output circuit and thus important possibilities of interference particularly on radio circuits, are cut out.

A more detailed description will now be given of the regenerative repeater shown. It makes use of two telegraph relays, six thermionic valves all of the double triode type and a gas discharge tube, conveniently a neon tube.

The telegraph relays RL and S are shown operated to the "mark," i. e. idle, position. In this position, the valves are in the condition given in the table below:

| Valve No. | Left-hand triode | Right-hand triode |
|---|---|---|
| V1 | cut-off | conducting. |
| V2 | do | Do. |
| V3 | do | Do. |
| V4 | conducting | cut-off. |
| V5 | cut-off | conducting. |
| V6 | nearly cut-off | nearly cut-off. |
| V7 | cut-off | |

At this time no current flows through the righthand coil of relay RL since the left-hand triode of valve V5 is cut off. Incoming signals from the line IN are applied to the left-hand coil of this relay which therefore under these conditions follows the incoming signals faithfully.

The first space signal appearing on line IN energises relay RL which operates contact RL1 to the alternate position and capacitor C1 charges via resistors R2 and RV1. When capacitor C1 attains sufficient voltage, the left-hand triode of valve V1 conducts, causing the voltage on the grid of the right-hand triode to drop sufficiently to cut-off this triode. Resistor RV1 is made variable to give adjustment of the interval between the operation of contacts RL1 and the cut-off of the left-hand triode of valve VI. This interval is usually adjusted to 10 milliseconds, and in the following description it is assumed that the interval is 10 milliseconds. If contact RL1 restores to its original position before the triggering voltage is reached, capacitor C1 discharges quickly through resistor R1, thus completely restoring the circuit to the idle condition. Short duration spurious space signals are therefore suppressed.

When the right-hand triode of valve V1 is cut-off a positive pulse is applied to the grids of the left-hand triodes of valves V2 and V3 via capacitor C3 and rectifier W2 and capacitor C2 and rectifier W1 respectively. The positive pulse causes both these valves to conduct and negative pulses from their anodes are applied to the grids of the right-hand triodes of valves V2 and V3 so as to cause these valves to cut off. The pulses are applied via time constant circuits comprising capacitor C5 and resistors RV2, R20 and R21 and capacitor C4 and resistors RV3 and R22 respectively, which are adjusted by RV2 and RV3 so that the right-hand triode of the valve V2 again conducts after 130 milliseconds and the right-hand triode of valve V3 again conducts after 110 milliseconds. Thus these triodes reconduct after 140 milliseconds and 120 milliseconds respectively from the receipt of the beginning of the start element.

When the right-hand triode of valve V2 cuts off, the voltage on its anode rises sufficiently to strike the gas discharge tube V7 which as already mentioned is preferably neon-filled. A voltage is thus developed across resistor R32 and this voltage is considerably higher than the voltage on the right-hand grid of valve V4. The right-hand triode of valve V5 is connected as a diode, and as the voltage on its cathode rises due to tube V7 striking, it becomes an infinite impedance between R32 and the right-hand grid of valve V4. Capacitor C10 reaches the conducting voltage for the latter triode very quickly, thus triggering this valve. Valve V4 is connected as a multivibrator which then continues to oscillate until tube V7 is extinguished by the reconduction of the right-hand triode of valve V2, i. e. after 130 milliseconds. As tube V7 is extinguished, the right-hand triode of valve V5 again becomes a low impedance between the right-hand grid of valve V4 and R32, thus holding the multivibrator at rest.

The multivibrator V4 is adjusted by RV4 to the required speed of transmission, viz. 50 c./s. for the usual 20 millisecond elements. During its running period the multivibrator delivers seven positive pulses from its left hand anode to the grids of valve V6 via rectifier W3 and capacitors C11 and C12. The potential dividing circuit formed by resistors R39 and R40 is arranged so that the amplitude of the pulses received by the right-hand grid of V6 is appreciably less than the amplitude of the pulses received by the left-hand grid.

Both triodes of valve V6 are normally nearly at the cut-off point due to the bias developed by the common cathode resistor R37. On receipt of the positive pulses, with the circuit in the condition shown the pulse of greater amplitude applied to the left-hand grid is more effective and causes the left hand triode to conduct fully. The increase of current through the common cathode resistor R37 has the effect of cutting off the right-hand triode completely. Consequently the left-hand coil of telegraph relay S is effective and contact S1 is therefore operated to the "mark" contact as shown if it is not already in that position. If, however, contact RL1 is resting on its alternate contact i. e. the "space" contact, as it would be on receipt of a start signal, the pulse to the left-hand triode of V6 is short-circuited to earth via contact RL1, and the right-hand triode of valve V6 takes control and cuts off the left-hand triode completely. Contact S1 is therefore operated to the alternate position i. e. the "space" contact since the two coils act in opposite senses. Thus relay S is controlled during each of the seven pulses from the multivibrator and the position of contact S1 corresponds to the position of contact RL1 at the instant the incoming signal elements are scrutinised.

When the right-hand triode of valve V3 re-conducts 120 milliseconds after the receipt of the start signal, the left-hand triode of valve V3 is again cut-off, and a positive pulse from its anode is applied to the left-hand grid of valve V5 via capacitor C7. The left-hand triode of valve V5 is normally out-off by the bias obtained from the potential dividing circuit formed by resistors R30 and R23 but it now conducts for 25–30 milliseconds, a period determined by the value of resistor R24. During this time the right-hand coil of relay R1 is energised sufficiently to swamp the effect of the left-hand coil and contact RL1 is moved to the "mark" contact regardless of the effect of the incoming signal on the left-hand coil. Thus contact RL1 is always in the "mark" position when the seventh pulse from the multivibrator is received by valve V6 so that relay S always produces a "mark" signal for the seventh element.

Relay S has therefore been set each 20 milliseconds according to the incoming signals for the "start" and five coding elements and to "mark" for the stop element. Perfectly shaped signals are thus re-transmitted lagging behind the incident signals by 10 milliseconds. At the end of the "mark" signal representing the stop element the circuit is again in the idle state except for the current flowing through the left-hand triode of valve V5, and as soon as this ceases, the circuit is ready for the next incoming signal.

As an alternative to the circuit shown, which may give improved operation in certain circumstances, the circuit of the valve V6 may be modified so that the left-hand grid of this valve is not directly connected to earth when the contacts RL1 are in the "space" position. With this modification a further resistor having a value equal to that of resistor R36 is inserted between the left-hand grid of valve V6 and the junction of capacitor C11 and resistor R36 while connection from the "space" contact of RL1 is made to the grid by way of a further resistor of the same value as resistor R36. In these circumstances it can be arranged that if the amplitude of the pulse applied to the right-hand grid is considered as one half, the pulse applied to the left-hand grid is either one-quarter or three-quarters dependent upon the position of contacts RL1. This increases the margins of valve V6 and gives a further improvement in the operation of the retransmitting relay S.

I claim:

1. In a regenerative repeater for start-stop telegraph systems, a multi-vibrator having a period equal to the length of each code element, a timing device, means responsive to the receipt of a signal of the polarity of a start signal for setting said timing device in operation, means for terminating the operation of said timing device on the cessation of said signal, means controlled by said timing device if it remains in operation for a predetermined time for setting said multi-vibrator in operation to generate pulses, a receiving relay, a retransmitting relay, means operative on receipt of each pulse from said multi-vibrator for setting said retransmitting relay in accordance with the instantaneous setting of said receiving relay, and means for terminating the operation of said multi-vibrator after a predetermined number of operations.

2. In a regenerative repeater for start-stop telegraph systems, a multi-vibrator having a period equal to the length of each code element, a timing device, means responsive to the receipt of a signal of the polarity of a start signal for setting said timing device in operation, means for terminating the operation of said timing device on the cessation of said signal, means controlled by said timing device if and when it completes its operation for setting said multi-vibrator in operation to generate pulses, means for varying the period of operation of said timing device, a receiving relay, a retransmitting relay, means operative on receipt of each pulse from said multi-vibrator for setting said retransmitting relay in accordance with the instantaneous setting of said receiving relay and means for terminating the operation of said multi-vibrator after a predetermined number of operations.

3. In a regenerative repeater for start-stop telegraph systems, a multi-vibrator having a period equal to the length of each code element, a thermionic valve having a grid element, a capacitor associated with said grid element, a receiving relay, means for progressively charging said capacitor under the control of a contact of said receiving relay to a potential which will cause said thermionic valve to conduct, means responsive to the operation of said receiving relay on receipt of a signal of the polarity of a start signal for initiating the charging of said capacitor, means for discharging said capacitor responsive to the release of said receiving relay before said capacitor is charged to a potential which will cause said thermionic valve to conduct, means controlled by said thermionic valve in the conducting state for setting said multi-vibrator in operation to generate pulses, a retransmitting relay, means operative on receipt of each pulse from said multi-vibrator for setting said retransmitting relay in accordance with the instantaneous setting of said receiving relay and means for terminating the operation of said multi-vibrator after a predetermined number of operations.

4. In a regenerative repeater as claimed in claim 2 a gas discharge tube, means for causing said tube to strike when said timing device completes its operation, a diode connected so that the striking of the gas discharge tube causes said diode to assume an infinite impedance and connections between said diode and a thermionic valve comprised in said multi-vibrator whereby said multi-vibrator is set in operation on the striking of said gas discharge tube.

5. In a regenerative repeater for start-stop telegraph operation over a signalling line, a multi-vibrator having a period equal to the length of each code element, a receiving relay responsive to signals received over said line, means responsive to the operation of said receiving relay on receipt of a signal of a polarity of a start signal for setting said multi-vibrator in operation to generate pulses, a retransmitting relay, means operative on receipt of each pulse from said multi-vibrator for setting said retransmitting relay in accordance with the instantaneous setting of said receiving relay and means effective after the receipt of a predetermined number of pulses from said multi-vibrator for effecting a predetermined setting of said receiving relay regardless of the signals received over said line.

6. In a regenerative repeater for start-stop telegraph operation over a signalling line, a multi-vibrator having a period equal to the length of each code element, a receiving relay responsive to signals received over said line, means responsive to the operation of said receiving relay on receipt of a signal of the polarity of a start signal for setting said multi-vibrator in operation to generate pulses, a retransmitting relay, means operative on receipt of each pulse from said multi-vibrator for setting said retransmitting relay in accordance with the instantaneous setting of said receiving relay, a first timing device including a thermionic valve and a capacitor, means controlled by said first timing device for nullifying the effect on said receiving relay of signals received over said line, a second timing device including a thermionic valve and a capacitor, and means controlled by said second timing device for stopping the operation of said multi-vibrator after a predetermined number of pulses have been generated.

7. In a regenerative repeater for start-stop telegraph operation over a signalling line, a multi-vibrator having a period equal to the length of each code element, a thermionic valve, a receiving relay provided with two windings, one of said windings being connected to said signalling line and the other in the anode circuit of said thermionic valve, a timing device having a period of operation equal to six code elements, means responsive to the operation of said receiving relay on the receipt of a signal of the polarity of a start signal for setting said timing device in operation, and means controlled by said timing device on completing its operation for rendering said thermionic valve conductive whereby said relay is set by current flow through said second winding regardless of the nature of current flow over said signalling line through said first winding.

8. In a regenerative repeater for start-stop telegraph systems, a multi-vibrator having a period equal to the length of each code element, a receiving relay, a retransmitting relay provided with two windings connected in opposition, a first thermionic valve having one of said windings in its anode circuit, a second thermionic valve having the other of said windings in its anode circuit, a receiving relay, means responsive to the operation of said receiving relay on receipt of a signal of the polarity of a start signal for setting said multi-vibrator in operation to transmit positive pulses to the grids of said first and second thermionic valves, means for adjusting the bias on said grids whereby said first winding predominates when pulses are fed to both grids and a contact on said receiving relay arranged to apply negative potential to the grid associated with said first winding whereby said second winding predominates to cause said retransmitting relay to be operated to its alternate position.

References Cited in the file of this patent

UNITED STATES PATENTS

| | | |
|---|---|---|
| 2,406,096 | Morrison | Aug. 20, 1946 |
| 2,430,547 | Anderson | Nov. 11, 1947 |
| 2,474,490 | Pelle | June 28, 1949 |

FOREIGN PATENTS

| | | |
|---|---|---|
| 470,654 | Great Britain | Aug. 19, 1937 |